P. E. BASSETT.
DEVICE FOR OVERCOMING VIBRATION OF SPINDLES.
APPLICATION FILED DEC. 17, 1914.
1,162,125. Patented Nov. 30, 1915.
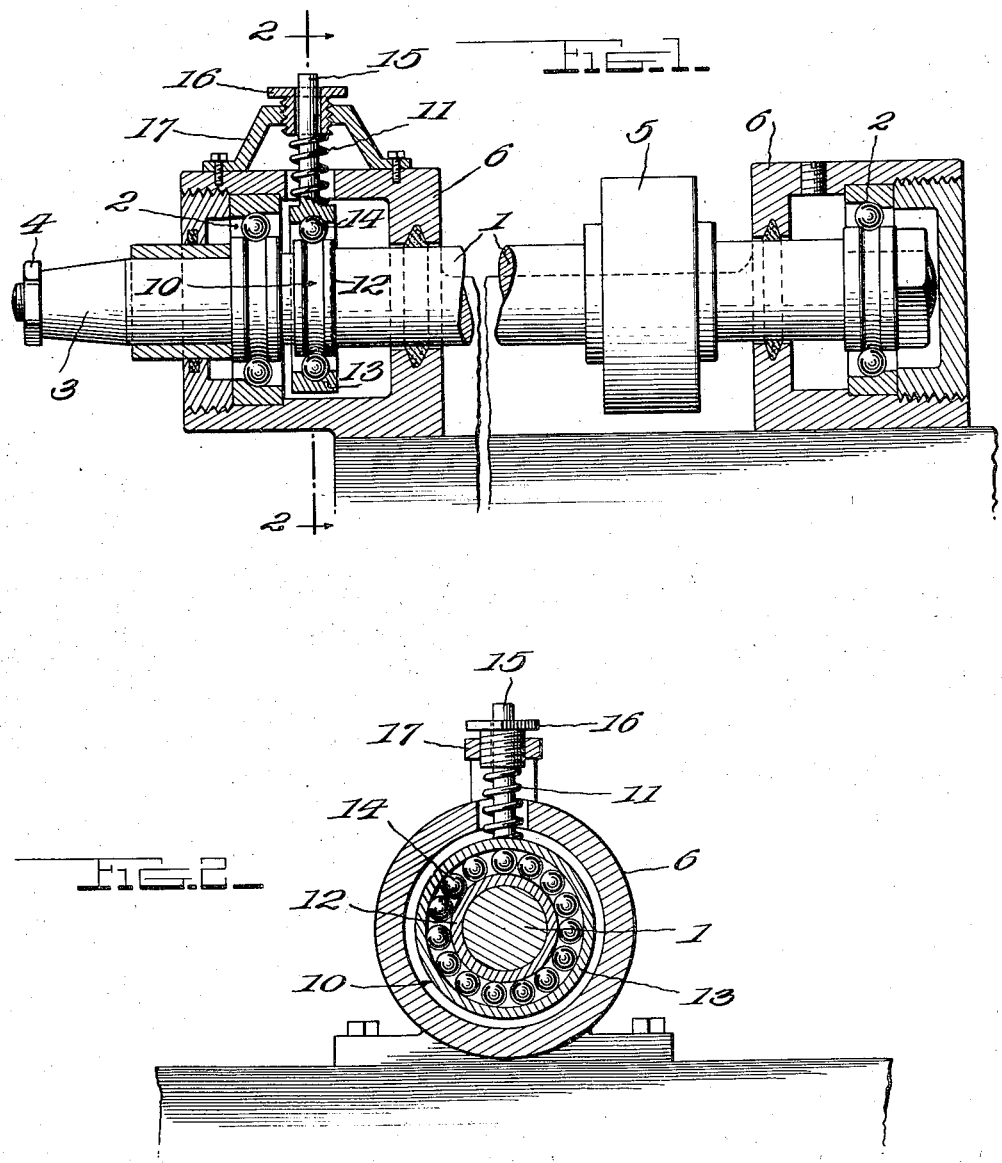

UNITED STATES PATENT OFFICE.

PLINY E. BASSETT, OF WORCESTER, MASSACHUSETTS.

DEVICE FOR OVERCOMING VIBRATION OF SPINDLES.

1,162,125. Specification of Letters Patent. Patented Nov. 30, 1915.

Application filed December 17, 1914. Serial No. 877,732.

*To all whom it may concern:*

Be it known that I, PLINY E. BASSETT, a citizen of the United States, residing at Worcester, in the county of Worcester and State of Massachusetts, have invented certain new and useful Improvements in Devices for Overcoming Vibration of Spindles; and I do declare the following to be a full, clear, and exact description of the invention, such as will enable others skilled in the art to which it appertains to make and use the same.

My invention is a device for overcoming vibration of spindles, and more particularly those mounted to revolve in ball bearings.

The object of the invention is to provide such a device which may be simply and inexpensively constructed and which, when applied, will effectively prevent vibration of the shaft or spindle with which it is employed.

With this end in view, the invention resides in certain novel features of construction and combination herein described and claimed and shown in the drawings wherein;

Figure 1 is a side elevation of a spindle showing its bearings in section and illustrating the application of my invention; and Fig. 2 is a transverse section as seen on the line 2—2 of Fig. 1.

In this drawing, forming a part of the application, a horizontal spindle or shaft 1 is shown, whose opposite ends are mounted in ball bearings 2. One end of the spindle is extended beyond the adjacent bearing 2, is reduced at 3, and provided with a clamping nut 4, whereby a tool to be operated (which tool may be a cutter head or a grinding wheel), may be clamped on said spindle. The spindle is further provided with any appropriate means by which it may be rotated, this means being here indicated in the form of a pulley 5.

The structure so far described constitutes no part of the present invention and, as is common with devices of this character, both of the bearings 2 are incased in suitable housings 6 whereby they are protected against dust and dirt and may be lubricated to the necessary extent by admitting oil into these casings or housings.

By actual experience it has been found that spindles or shafts mounted in the manner just described, are prone to vibrate, when rotated, and when the tool is in use. For overcoming this most objectionable feature, I intend to provide a floating ball bearing 10 located between the bearings 2, and a spring 11, for normally forcing this floating bearing in such a direction as to prevent vibration of the shaft in the bearings, or, in other words, to force one side of the shaft always into contact with the balls at one side of the bearing.

The floating bearing 10 comprises a ring 12 which is shrunk on or otherwise secured to the spindle 1, and which therefore, rotates therewith, a non-rotatable ring 13 which encircles and is spaced from the ring 12, and a plurality of ball bearings 14 interposed between the rings 12 and 13. Both of these rings and the ball bearings 14 are here shown as located in one of the housings 6 and the outermost ring 13 is provided with a stud or pin 15 which projects laterally through an opening in this housing and through a suitable form of guide 16 which is threaded through a bracket 17, the latter being secured to and spaced outwardly from the adjacent housing. It will be noted that the coiled spring 11 surrounds the stud or pin 15 and bears respectively at its inner and outer ends against the ring 13 and the guide 16, this guide being here shown in the form of a sleeve. By this structure, the sleeve may be threaded farther into the bracket 17, to increase the tension of the spring 11 or may be loosened to relieve such tension.

I have described one form of spring 11 for exerting its tension against the floating bearing 10, and have also described one manner in which the tension of this spring may be varied. It will be understood, however, that under the scope of the appended claims, any appropriate form of spring and any desirable tension regulating device may be employed.

It will be further understood, that although the drawings illustrate the invention as applied to a horizontal shaft, it may be used to equal advantage upon a spindle or shaft which stands upright. In employing the invention with such an upright shaft, however, it is necessary to employ a plurality of floating bearings 10 and springs 11, and to space these springs a suitable number of degrees from each other.

The invention as above described and illustrated in the drawings, has been thoroughly tested and it has been found to possess all advantages claimed.

I claim:

1. The combination with a revolubly mounted spindle; of a floating bearing thereon, and a single spring device exerting its tension against said bearing in a radial direction whereby to prevent vibrating of the shaft by forcing said shaft tightly against its bearings.

2. The combination with a revolubly mounted spindle; of a non-rotatable bearing ring surrounding the same, an integral pin projecting radially outward from said ring, a guide through which the pin passes, and a spring between the guide and the ring.

3. The combination with a revolubly mounted spindle; of a ring surrounding the same and secured thereto, a second and non-rotatable ring surrounding the other ring, a pin projecting radially outward from said non-rotatable ring, a fixed guide through which said pin passes, and a coiled spring surrounding the pin and interposed between the guide and the non-rotatable ring.

In testimony whereof I have hereunto set my hand in presence of two subscribing witnesses.

PLINY E. BASSETT.

Witnesses:
EDGAR E. BUCK,
JAMES L. BUCK.